US009363857B2

(12) United States Patent
Feri et al.

(10) Patent No.: US 9,363,857 B2
(45) Date of Patent: Jun. 7, 2016

(54) MODULATION OF LIGHT EMITTED BY A LIGHTING DEVICE, USING PLURALITY OF DIFFERENT MODULATION PERIODS

(71) Applicant: KONINKLIJKE PHILIPS N.V., Eindhoven (NL)

(72) Inventors: Lorenzo Feri, Eindhoven (NL); Stephanus Joseph Johannes Nijssen, Eindhoven (NL); Tommaso Gritti, Eindhoven (NL); Ruben Rajagopalan, Neuss (DE); Frederik Jan De Bruijn, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 14/372,554

(22) PCT Filed: Jan. 14, 2013

(86) PCT No.: PCT/IB2013/050326
§ 371 (c)(1),
(2) Date: Jul. 16, 2014

(87) PCT Pub. No.: WO2013/108167
PCT Pub. Date: Jul. 25, 2013

(65) Prior Publication Data
US 2015/0028763 A1    Jan. 29, 2015

Related U.S. Application Data

(60) Provisional application No. 61/587,298, filed on Jan. 17, 2012, provisional application No. 61/599,459, filed on Feb. 16, 2012.

(51) Int. Cl.
*H05B 37/02* (2006.01)
*H05B 33/08* (2006.01)
*H04B 10/116* (2013.01)

(52) U.S. Cl.
CPC .......... *H05B 33/0821* (2013.01); *H04B 10/116* (2013.01); *H05B 37/0272* (2013.01)

(58) Field of Classification Search
CPC ....... H04B 10/11; H04B 10/116; H05B 37/02
USPC .......... 315/134, 149, 151, 158; 398/118, 130, 398/172
See application file for complete search history.

(56) References Cited

U.S. PATENT DOCUMENTS 6,198,230 B1    3/2001   Leeb
8,699,887 B1 *  4/2014   Rothenberg ......... H04B 10/116
                                          315/158

(Continued)

FOREIGN PATENT DOCUMENTS

EP    2088836 A1    8/2009
EP    2503852 A1    9/2012

(Continued)

*Primary Examiner* — Jason M Crawford
(74) *Attorney, Agent, or Firm* — Meenakshy Chakravorty

(57) ABSTRACT

The possibility to emit and detect coded light, whereby data is modulated into the light, is known. According to one aspect of the present disclosure, to reduce the risk of the modulation going undetected due to possible frequency blind spots in the detection spectrum, the lighting device (2a, 2b, 2c) is arranged such that the frequency of its emitted modulated light (3a, 3b, 3c) shivers around a base, or center, frequency. For example the modulated light (3a, 3b, 3c) may be transmitted using pulse-width-modulation, and the resulting pulse-width-modulation light signal (3a, 3b, 3c) may thus have a period that fluctuates around the base period (T). The parameters determining the shivering of the modulated light (3a, 3b, 3c) may be chosen such that visible flicker in the emitted modulated light (3a, 3b, 3c) is avoided. According to another aspect, the lighting device (2a, 2b, 2c) emits with a plurality of different modulation frequencies simultaneously.

20 Claims, 4 Drawing Sheets

(56) References Cited

U.S. PATENT DOCUMENTS

| | | | | |
|---|---|---|---|---|
| 8,737,842 B2* | 5/2014 | Schenk | ............... | H05B 33/0863 398/107 |
| 8,749,146 B2* | 6/2014 | Jones | ................ | H05B 37/0272 315/149 |
| 2008/0185969 A1* | 8/2008 | Vegter | .................... | H05B 37/02 315/158 |
| 2009/0245806 A1* | 10/2009 | Murayama | ........... | H04B 10/116 398/130 |
| 2010/0301776 A1* | 12/2010 | Feri | ..................... | H05B 37/029 315/312 |
| 2010/0327754 A1* | 12/2010 | Schenk | ................. | H05B 37/02 315/51 |
| 2012/0091896 A1* | 4/2012 | Schenk | .............. | H05B 37/0245 315/132 |
| 2012/0119657 A1* | 5/2012 | Snijder | ..................... | F21V 5/04 315/149 |
| 2012/0153838 A1* | 6/2012 | Schenk | .............. | H05B 37/0272 315/151 |
| 2012/0200226 A1* | 8/2012 | Knibbe | .............. | H04B 10/1149 315/151 |
| 2013/0140995 A1* | 6/2013 | Jones | ................. | H05B 37/0218 315/151 |

FOREIGN PATENT DOCUMENTS

| | | |
|---|---|---|
| WO | WO2006111930 A2 | 10/2006 |
| WO | WO2007099472 A1 | 9/2007 |
| WO | WO2008050293 A1 | 5/2008 |
| WO | WO2008050294 A1 | 5/2008 |
| WO | WO2009090511 A2 | 7/2009 |
| WO | WO2010116299 A1 | 10/2010 |

* cited by examiner

_US 9,363,857 B2_

MODULATION OF LIGHT EMITTED BY A LIGHTING DEVICE, USING PLURALITY OF DIFFERENT MODULATION PERIODS

CROSS-REFERENCE TO PRIOR APPLICATIONS

This application is a U.S. national stage application under 35 U.S.C. §371 of International Application No. PCT/IB2013/050326, filed on Jan. 14, 2013, which claims priority benefit under 35 U.S.C. §119(e) of U.S. Provisional Application No. 61/587,298 filed on Jan. 17, 2012 and U.S. Provisional Application No. 61/599,459 filed on Feb. 16, 2012, the contents of which are herein incorporated by reference.

FIELD OF THE INVENTION

The present invention relates to the field of lighting systems, and in particular to a lighting device in a lighting system and methods corresponding thereto.

BACKGROUND OF THE INVENTION

The advent of integrated lighting installations, consisting of an ever growing number of individually controllable light sources, lighting devices, luminaires, lighting arrangements and the like with advanced rendering capabilities, may be regarded as transforming lighting systems for both professional and consumer markets. This brings a desire for an intuitive control capable of fully exploiting the rendering capabilities of the complete lighting infrastructure. Several approaches have been proposed to control light sources, lighting devices, luminaires, lighting arrangements and the like.

Optical free space communications, i.e. visible light (VL) and infra-red (IR) communications, for the selection and advanced control of light sources has previously been proposed, and will be referred to as coded light (CL). In general, coded light has been proposed to enable advanced control of light sources. Coded light is based on embedding of data, inter alia invisible identifiers, in the light output of the light sources. Coded light may thus be defined as the embedding of data and identifiers in the light output of a visible light source, wherein the embedded data and/or identifier preferably do not influence the primary lighting function of the light source. Hence, any modulation of the emitted light pertaining to data and/or identifier should be substantially invisible to humans. This allows for applications such as interactive scene setting, commissioning and re-commissioning of networked lighting systems. Coded light may be used in communications applications wherein one or more light sources in a coded lighting system are configured to emit coded light and thereby communicate information to a receiver.

One example for controlling light sources, lighting devices, luminaires, lighting arrangements and the like involves the concept of point and control; this approach exploits the principle of coded light and a remote control unit capable of detecting the code of the light source or luminaire toward which the remote control unit is pointed and thereby to identify the light source or luminaire emitting the coded light. Such a remote control unit typically comprises one or more photodiodes for detecting the coded light emitted by the light source or luminaire. Alternatively the remote control unit may comprise a camera for detecting the coded light. One implementation of the concept of point and control involves having light sources or luminaires sending a unique coded light signal. Different light sources or luminaires send a different signal (i.e. signals with different embedded unique identifiers). One example of signals suitable for this purpose is pulse width modulation (PWM). The point and control approach shows the advantage of using coded light as a mean for a user to be able to select a luminaire by simply pointing the remote control unit towards it. As noted above this approach employs a photodiode in order to detect the coded light message of each luminaire. It has been proposed to detect and decode coded light by means of a standard camera.

European patent application EP11159149.1 relates to a system and method for detecting data embedded into the light output of illumination light detection systems. The light detection system captures light outputted from a scene in a 2D image, and temporal shifted line instances serve as light sample moments. The temporal shift between the capture of consecutive rows on the light detection means during the image capture process gives rise to a line-wise variation in pixel values for those areas in the final captured image of the scene that correspond to parts of the objects that are illuminated with said modulated light source or to the light source itself The line-wise variation in pixel values constitute a pattern of horizontal lines superimposed on top of the image at illuminated objects. The decoding of the message, i.e. the embedded code, in the encoded light requires the recovery of a 1-dimensional (1D) signal that is associated with the original intensity variations of the modulated light source.

SUMMARY OF THE INVENTION

The inventors of the enclosed embodiments have identified a number of disadvantages with the above noted concepts. For example, it has been found that fundamental limitation of the cameras typically embedded in portable electronic devices, such as (but not limited to) mobile communications devices (such as mobile phones, smartphones, tablet computers, and laptop computers) renders detection of coded light not always reliable and/or reproducible.

It is an object of the present invention to overcome these problems, and to provide a lighting device and a lighting system comprising a number of lighting devices that are arranged such that the risk of the coded light emitted by the lighting devices being undetected is reduced.

According to one aspect of the present invention, there is provided a lighting device comprising: a light emitter arranged to emit light with a periodic modulation; and a light driver arranged to drive the light emitter by providing an indicator to the light emitter, the indicator relating to the modulation of the light to be emitted by the light emitter and the light emitter being arranged to emit the light modulated according to said indicator; wherein the light driver is arranged to drive the light emitter to emit light with a plurality of different modulation periods.

In embodiments, the light emitter may be arranged to emit light to be detected by an image capturing unit; and the light driver may be arranged to drive the light emitter to avoid that at least one of the modulation periods corresponds to a frequency blind spot produced by an acquisition process of the image capturing unit.

In embodiments, the light driver may be arranged to change between the different modulation periods over time.

In a first embodiment, there may be provided a lighting device for emitting modulated light, comprising a light driver arranged to provide an indicator to a light emitter of said lighting device, the indicator relating to modulation of light to be emitted by the light emitter in one of at least two states, the light driver thereby driving the light emitter; and a light emitter arranged to emit modulated light according to said indicator, wherein the modulation is periodic within each state, wherein in a first state said modulation has a period $T_{11}$, and wherein in a second state said modulation has a period $T_{12} \neq T_{11}$, wherein $T_{11}$ and $T_{12}$ take values within an interval $[T_{10}-\Delta T_1/2, T_{10}+\Delta T_1/2]$, where $T_{10}>0$ is a time constant and where $\Delta T_1>0$ is a time offset chosen such that visible flicker in the emitted modulated light is avoided.

Since the frequency of the modulation changes over time, a lighting device arranged according to the first aspect advantageously enables the emitted modulated light to be detectable by an image capturing unit capturing images at a given fixed exposure time setting. Thus, advantageously such a lighting device prevent a rolling shutter camera from being blind to information included in the modulated light emitted by the lighting device.

According to a second embodiment, there is porvided a lighting system comprising a number N of lighting devices according to the first aspect, wherein each lighting device is associated with its own unique constant $T_i$, i=1 ... N, wherein the modulation for each lighting device is periodic within each state, wherein in a first state said modulation for light source i has a period $T_{i1}$, and wherein in a second state said modulation for light source i has a period $T_{i2} \neq T_{i1}$, wherein $T_{i1}$ and $T_{i2}$ take values within an interval $[T_{i0}-\Delta T_i/2, T_{i0}+\Delta T_{i0}/2]$, where $T_{i0}>0$ is a time constant for light source i and where $\Delta T_i>0$ is a time offset for light source i chosen such that visible flicker in the emitted modulated light is avoided.

In third, alternative or additional embodiment, the light driver may be arranged to drive the light emitter to emit light modulated with a plurality of different modulation periods simultaneously.

In embodiments the light emitter may be arranged to emit light to be detected by a detecting unit; and the modulation frequencies may be spaced apart by an amount at least corresponding to an undetectable width of a blind spot in a detection spectrum of the detecting unit, so at least so that at least one of the modulation periods is always detectable regardless of where at least one other of the other falls in the detection spectrum relative to the one or more blind spots.

In embodiments, the modulation frequencies may be spaced apart to avoid an inter-modulation effect between any of the modulation frequencies being within a human perceptible range. In embodiments at least one of the modulation frequencies has no harmonic relationship with at least one other of the modulation frequencies.

In embodiments the plurality of modulation frequencies may be emitted by a same light source of said light emitter. Alternatively, the light emitter may comprise a plurality of light sources within a same luminaire, and each of the plurality of modulation frequencies may be emitted by a respective one of the light sources. It is noted that the invention relates to all possible combinations of features recited in the claims. For example, the advantages of the first aspect applies to the second aspect, and vice versa. Further, the third embodiment may be combined with the first or second embodiment.

BRIEF DESCRIPTION OF THE DRAWINGS

The above and other aspects of the present invention will now be described in more detail, with reference to the appended drawings showing embodiment(s) of the invention.

DETAILED DESCRIPTION

The below embodiments are provided by way of example so that this disclosure will be thorough and complete, and will fully convey the scope of the invention to those skilled in the art. Like numbers refer to like elements throughout. The devices disclosed in the below embodiments will be described in an operation context.

Figure 1:
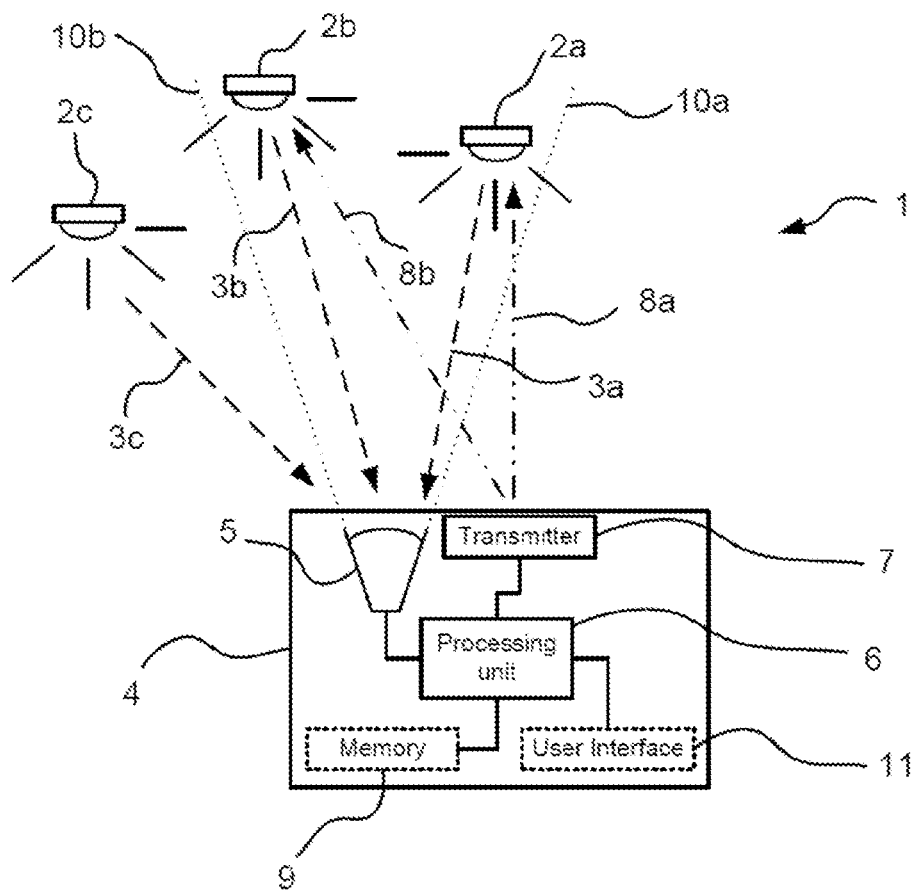
FIG. 1 illustrates a lighting system according to embodiments.
Figure 2:
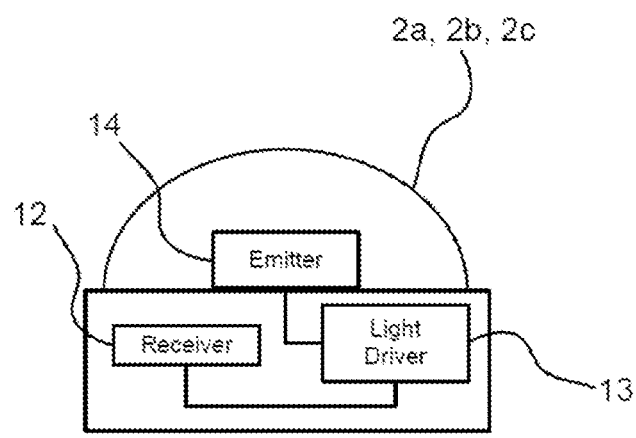
FIG. 2 illustrates a lighting device according to embodiments.
Figure 3:
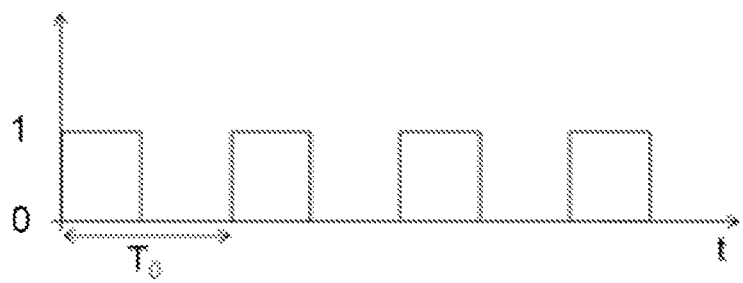
FIG. 3 schematically illustrates emitted light signals.
Figure 4:
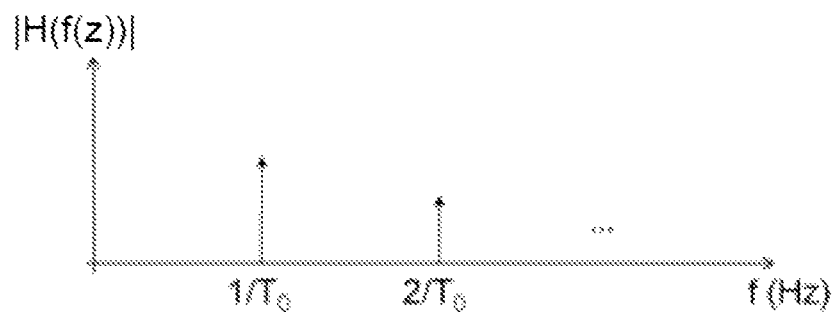
FIG. 4 illustrates the spectrum of the light signals of FIG. 3.

Operation of a lighting system will now be disclosed with reference to the lighting system 1 of FIG. 1. The lighting system 1 of FIG. 1 comprises at least one lighting device arranged to emit coded light, schematically denoted by lighting devices with reference numerals 2a, 2b, 2c. The at least one lighting device 2a, 2b, 2c may be a luminaire and/or be part of a lighting control system. The lighting system 1 may thus be denoted as a coded lighting system. As will be further disclosed with reference to FIG. 2 the lighting device 2a, 2b, 2c comprises at least a light driver and a light emitter. A luminaire may comprise at least one such lighting device 2a, 2b, 2c. The term "lighting device" means a device that is used for providing light in a room, for purpose of illuminating objects in the room. A room is in this context typically an apartment room or an office room, a gym hall, an indoor retail, environment, a theatre scene, a room in a public place or a part of an outdoor environment, such as a part of a street. Each lighting device 2a, 2b, 2c is capable of emitting coded light, as schematically illustrated by arrows 3a, 3b, 3c. The emitted light thus comprises a modulated part associated with coded light comprising information sequences. The modulated light may comprise additional embedded data. For example, the data may comprise a unique identifier of the lighting device. The emitted light may also comprise an un-modulated part associated with an illumination contribution. Each lighting device 2a, 2b, 2c may be associated with a number of light (or lighting) settings, inter alia pertaining to the illumination contribution of the lighting device, such as colour, colour temperature, intensity and frequency of the emitted light. In general terms the illumination contribution of the lighting device may be defined as a time-averaged output of the light emitted by the lighting device 2a, 2b, 2c. FIG. 3 schematically illustrates the light signal 3a, 3b, 3c emitted by a lighting device 2a, 2b, 2c which is assigned a base tone with frequency $f=1/T_0$. The base tone is emitted according to pulse width modulation with frequency $f=1/T_0$. The resulting signal (tone) is thus a single train of pulses. For multiprimary lighting devices 2a, 2b, 2c (e.g. LEDs with separate RGB channels) the resulting signal (tone) is the linear combination of various trains of pulses (one per primary color), all with the same base frequency. FIG. 4 shows the corresponding spectrum $|H(f(z))|$ being the absolute value of the Fourier transform of the frequency representation of the light signal of FIG. 3.

The system 1 further comprises a device termed a remote control unit 4 arranged to receive and detect the coded light emitted by the lighting devices 2a, 2b, 2c in the system 1. The remote control unit 4 will be described in terms of a number of functional blocks. The remote control unit 4 comprises an image capturing unit 5 having an image sensor for detecting the light emitted by the lighting device(s) 2a, 2b, 2c in the system 1, for example by capturing images comprising coded light. Recent development, such as exemplified by European patent application EP11159149.1, has shown the possibility to detect coded light with the use of standard cameras. The image capturing unit 5 may be embodied as (part of) a camera. The remote control unit 4 further comprises a processing unit 6 operatively coupled to the image capturing unit 5. The processing unit 6 analyzes images captured by the image capturing unit 5 and from the captured images identifies coded light as transmitted by the lighting device 2a, 2b, 2c. The remote control unit 4 further comprises a transmitter 7 operatively coupled to the processing unit 6. The transmitter 7 may be arranged to communicate with the lighting device(s) 2a, 2b, 2c, as schematically illustrated by reference numerals 8a and 8b. The remote control unit 4 may be part of a mobile communications device (such as a mobile phone, a smart-phone, a tablet computer, or a laptop computer).

Figure 5:
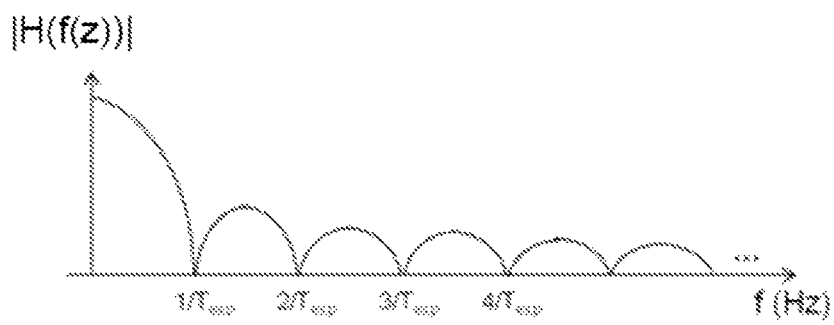
FIG. 5 schematically illustrates low-pass filter characteristics of an image capturing unit.

Typically the image capturing unit 5 is arranged to capture images at one of a plurality of different exposure times, or shutter speeds. With a fixed exposure time $T_{exp}$ the acquisition process of the image capturing unit 5 produces a low pass filtering effect on the acquired light signal whereby the cut-off frequency (in Hertz) of the low pass filter is determined by the shutter speed value $T_{exp}$ (in seconds). In more detail, when the light signal 3a, 3b, 3c from a lighting device 2a, 2b, 2c reaches the image capturing unit 5, the image capturing unit 5 acquires the light signal 3a, 3b, 3c. During the acquisition process, the rolling shutter exposes each line of the image sensor of the image capturing unit 5 to the light for a time $T_{exp}$. This acquisition process thus produces a low pass filtering effect on the acquired light signal. FIG. 5 schematically illustrates the low-pass filter characteristic $|H(f(z))|$ being the absolute value of the Fourier transform of the frequency representation of the acquisition process of an image capturing unit 5 having a rolling shutter camera with an exposure time $T_{exp}$. Thus in case one or more of the lighting device 2a, 2b, 2c emits coded light at frequencies corresponding to the zero crossings (corresponding to multiples of the shutter speed value $T_{exp}$) in the low-pass filter characteristic $|H(f(z))|$ of the shutter speed of the image capturing unit 5, the image capturing unit 5 may not be able to record, or even to receive, the coded light. In other words, in order to have a reliable detection of coded light, it is necessary that the period of the signals used by the lighting devices 2a, 2b, 2c for visible light communications, for example, are not a multiple of the exposure time, else the image capturing unit 5 is "blind" to it.

Figure 6:
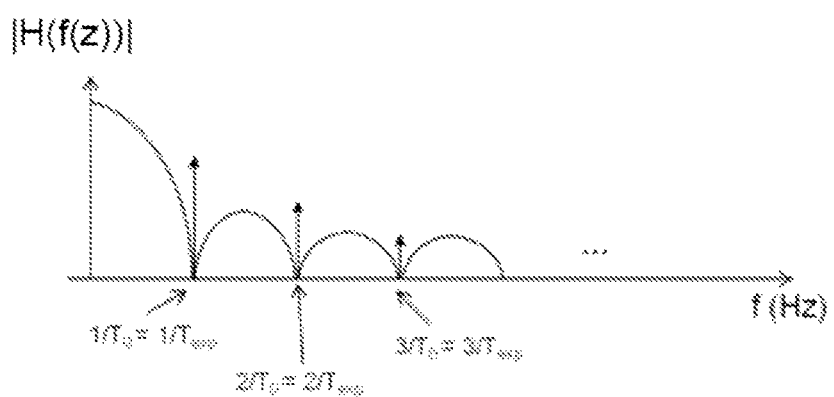
FIG. 6 schematically illustrates low-pass filter characteristics of an image capturing unit together with the spectrum of FIG. 4.

From FIG. 5, it is clear that the presence of blind spots corresponds to multiples of $f=1/T_{exp}$ where the low-pass filter has zeros. Thus, a tone with base frequency $f=1/T_0=1/T_{exp}$, as illustrated by spikes "↑" in FIG. 6, goes undetected.

Further functionality and properties of the lighting device 2a, 2b, 2c will be described next with further references to FIG. 2. In order to overcome the above problems, a lighting device 2a, 2b, 2c emits coded light having a tone whose period varies slightly over time, or in other words it 'shivers' or fluctuates over time. Each lighting device i, where i=1 . . . N in a system of N lighting devices, shivers between at least two tones. By $T_{i1}$ is denoted one of the shivering tones for lighting device i, and by $T_{i2}$ is denoted another of the shivering tones for lighting device i. Thus, $T_{i1} \neq T_{i2}$ for lighting device i. The unique identifier as embedded in the data of the emitted modulated light for lighting device i may be represented by a frequency $f=1/T_{i0}$, where $T_{i0}$ is the base period for the base tone around which the shivering tones fluctuate. Thus $T_{i0} \neq T_{i1} \neq T_{i2}$.

The lighting device 2a, 2b, 2c comprises a light driver 13. The lighting device 2a, 2b, 2c also comprises a light emitter 14. The light driver 13 is arranged to provide the light emitter 14 with an indicator. The indicator may be provided by means of an electrical signal. Alternatively the indicator may be provided by means of a mechanical switch or relay. The indicator relates to modulation of light to be emitted by the light emitter 14 in one of at least two states. The indicator thus determines according to which one of the at least two states the light emitted by the light emitter 14 in current operation is to be emitted. The light driver 13 is thereby arranged to drive the light emitter 14. Further, the light emitter 14 is arranged to emit modulated light according to the indicator. Preferably the modulated light is transmitted using pulse-width-modulation.

Figure 7:
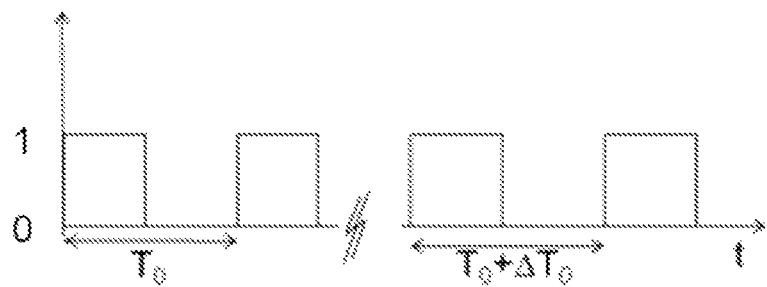
FIG. 7 schematically illustrates emitted light signals.
Figure 8:
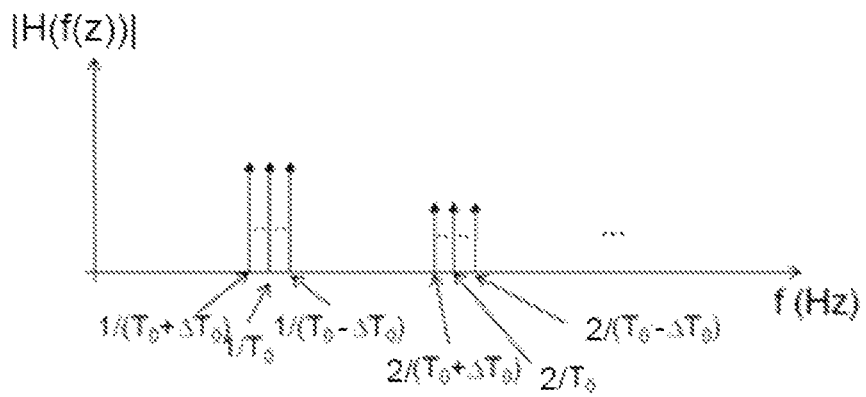
FIG. 8 illustrates the spectrum of the light signals of FIG. 7.

FIG. 7 illustrates the light signal sent by a lighting device 2a, 2b, 2c that is arranged to emit a shivering tone with base frequency $f=1/T_0$ (in case only one lighting device is considered the index i may be dropped—in other words: $T_{10}=T_0$ for N=1). The resulting PWM light signal has a period that fluctuates around the base period $T_0$. For simplicity a lighting device 2a, 2b, 2c with a single primary (wherein the light emitter 14 comprises of white LEDs) and the resulting signal (tone) is a single train of pulses. For the case of multiprimary lighting devices 2a, 2b, 2c (e.g. RGB) the resulting signal (shivering tone) is the linear combination of various trains of pulses (one per primary), all with the same base frequency. FIG. 8 illustrates the corresponding spectrum $|H(f(z))|$ being the absolute value of the Fourier transform of the frequency representation of the light signal of FIG. 7 where each shivering tone is illustrated by a spike "↑".

Figure 9:
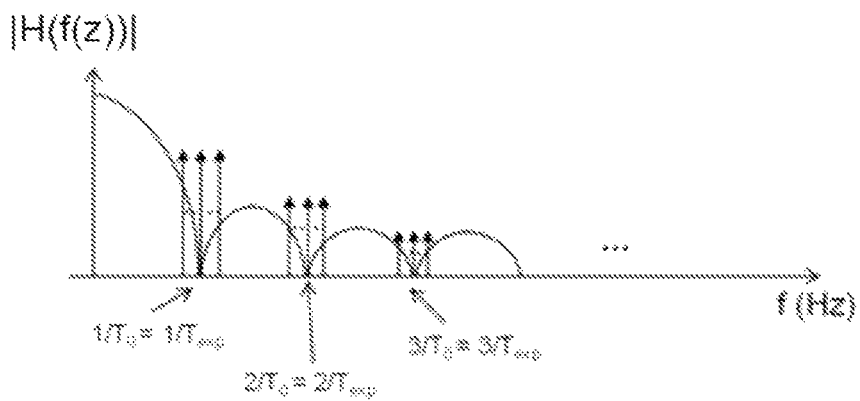
FIG. 9 schematically illustrates low-pass filter characteristics of an image capturing unit together with the spectrum of FIG. 8.

In FIG. 9 the resulting shivering tones (i.e. the spikes "↑") are illustrated in combination with the low-pass characteristics of the image capturing unit 5. Even for $1/T_0=1/T_{exp}$, some of the shivering tones will not fall in the blind spot and can therefore be detected.

In embodiments there are K shivering tones $T_{i1}, T_{i2}, \ldots T_{iK}$ for each lighting device i. Thus in practice there are not only two states but K different states representing K different shivering tones for each lighting device i. In such a case the indicator for each lighting device i thus relates to modulation of light to be emitted by the light emitter 14 in one of K states. In such a case the indicator thus determines according to which one of the K states the light emitted by the light emitter 14 in current operation is to be emitted.

Each lighting device i is associated with a time offset $\Delta T_i$ and a nominal time period $T_{i0}$. Preferably, each lighting device has its own nominal period. That is, $T_i \neq T_j$ for i≠j. In addition, each lighting device may be associated with its own time offset. That is, $\Delta T_i \neq \Delta T_j$ for i≠j. This may ease the detection and reception of information messages from different lighting devices.

For a system with only one lighting device, i.e. where N=1, the modulation in a first state has a period $T_{11}$ (the first shivering tone), and the modulation in a second state has a period $T_{12} \neq T_{11}$ (the second shivering tone), wherein $T_{11}$ and $T_{12}$ take values within an interval $[T_{10}-\Delta T_1/2, T_{10}+\Delta T_1/2]$, where $T_{10}>0$ is the time constant (the nominal time period for the single lighting device) and where $\Delta T_1 >0$ is the time offset (for single lighting device). If only two tones $T_{11}$ and $T_{12}$ are used, it may be beneficial that the light output is symmetric, in other words that $T_{12}-T_{10}=T_{10}-T_{11}$ for $T_{12}>T_{11}$. This may simplify the construction of the light emitter 14.

In general, the combination of parameters $T_{i0}$ and $\Delta T_i$ is chosen such that visible flicker in the modulated light emitted by the emitter 14 is avoided. More particularly, restricting the lower end point of the interval, $T_{i0}-\Delta T_i/2$, to be higher than a certain frequency may be beneficial in order to avoid flicker in the visible light. Restricting the upper end point of the interval, $T_{i0}+\Delta T_i/2$, to be lower than a certain frequency may be beneficial in order to keep the signals away from regions in the frequency representation where the low-pass filter attenuation is too severe for practical situations. The indicator as provided by the light driver 13 thus contains information relating to the current state (i.e. at which shivering tone the modulated light should be emitted).

For example a lighting device i that is assigned a base tone with period $T_i$ will transmit a tone that over time changes slightly within the range $[T_{i0}-\Delta T_i/2, T_{i0}+\Delta T_i/2]$. With $\Delta T_i>0$ this will thus avoid that a tone of any a lighting device i is emitted at any nominal period $T_{i0}$. Hence $T_{i0}$ is allowed to correspond to a blind spot of the above disclosed image capturing unit 5. Keeping $\Delta T_{i0} \ll T_{20}-T_{10}$, for $T_{20}>T_{10}$, where $T_{10}$ and $T_{20}$ are two time-wise adjacent time constants, provides sufficient separation between the tones of different lighting devices 2a, 2b, 2c.

The alternation between the K different states may be determined in different ways. For example, according to one embodiment the light driver 13 is arranged to a periodically alternate the modulation between the K different states. For example, according to another embodiment the light driver 13 is arranged to alternates the modulation between the K different states according to a predetermined sequence. The modulation may alternates between the K states according to a random variable. The modulation may be associated with one and the same state in at least two adjacent pulse width modulation periods. For example, each lighting device 2a, 2b, 2c may keep the PWM period constant for a time $T_c$ equal to several PWM periods. This means that the generated PWM signal when observed for a sufficiently short time will appear to have a constant repetition period. For example $T_c=1/30$ Hz, given that 30 Hz is the frame rate of a video camera. The shivering pattern can be the same for all the lighting device 2a, 2b, 2c or it can be different. In the latter case every lighting device 2a, 2b, 2c has a different Tc and jumps from one repetition period to another one (always within the above defined range) according to a different pattern (jump to a different period within the boundaries). The shivering pattern can be pre-assigned in the lighting devices 2a, 2b, 2c or it can be randomly generated in the lighting device 2a, 2b, 2c. The person skilled in the art realizes that the present invention by no means is limited to the preferred embodiments described above. On the contrary, many modifications and variations are possible within the scope of the appended claims. For instance, the disclosed remote control unit 4 and at least one luminaire comprising at least one lighting device 2a, 2b, 2c and being controllable by the remote control unit 4 may be provided as an arrangement.

As discussed, recent developments have shown the possibility to detect coded light with the use of standard cameras. For example, the present invention is applicable to the detection of coded light with a rolling-shutter camera. In a rolling-shutter image sensor, each subsequent image row is acquired with a small time delay with respect to the prior row. As a consequence, high-frequent temporal light flicker translates into spatial patterns of horizontal stripes. The rate at which subsequent rows are captured is referred to as the line rate $f^{line}$. As the line rate of most image sensors is relatively high (typically more than 10 kHz), the image sensor is capable of capturing light modulations that are sufficiently high to be imperceptible to humans.

It has been shown above how the value of the exposure time causes blind spots in the spectrum of detectable frequencies. Any frequency of which an integer number of cycles fits in the exposure time interval causes the integrated light modulation to cancel out. In the Fourier domain these blind frequency spots in fact coincide with the sinc-shaped frequency response that is the Fourier transform of the rectangular time window during which the light integration took place (FIG. 5 shows the magnitude of the sinc-shaped frequency response due to and exposure time $T_{exp}$).

In general, any repetitive signal, e.g. a repeated data packet, can be characterised by the sum of a harmonic signal with a fundamental frequency and additional harmonic signal components of that fundamental frequency. As such the invention is also applicable to repetitive signals in general, both to packets and waveforms.

Most integrated cameras in mobile devices do not provide an option to fix the exposure value of the camera. As a consequence, the camera is not capable to detect a coded light signal in case one of the spectral blind spots due to the momentary exposure time coincides with the lamp frequency. In general, for repetitive signals, the camera becomes unable to detect one or more harmonic components that are associated with the repetitive light signal. In general this leads to incorrect detections or even a loss of signal detection.

Also in case the modulation frequency of a PWM signal or one or multiple frequency components of a repetitive signal is close to a spectral blind spot, that signal component is not fully cancelled but still too weak for proper signal detection.

In the present disclosure, a lighting device for emitting modulated light and a lighting system comprising at least one such lighting device are disclosed. For example, the lighting device may be arranged such that its emitted modulated light is detectable by a standard rolling shutter speed camera. In order to do so the lighting device may be arranged such that the frequency of its emitted modulated light shivers around a base, or center, frequency. For example the modulated light may be transmitted using pulse-width-modulation. In this case the resulting pulse-width-modulation light signal thus has a period that fluctuates around the base period, and the parameters determining the shivering of the modulated light may be chosen such that visible flicker in the emitted modulated light is avoided.

However, the scope of the invention need not be limited to such embodiments. As has been explained, the invention lies in reducing the risk that coded light goes undetected. This is achieved by modulating light from a given lighting device with a plurality K of different modulation frequencies (where K is at least two and in embodiments greater than two). In the above embodiments, the different modulation frequencies are implemented by varying the frequency in a "shivering" pattern, but it will be appreciated given the disclosure herein that the idea of reducing of the risk of the modulation going undetected through can be implemented with any arrangement of different modulation frequencies. The following describes an alternative embodiment whereby the light is modulated such that multiple frequency components are generated simultanously, preferably so that in any given situation at least one modulation frequency will always fall outside any blind spot of the exposure time (i.e. there will never be a situation in which all frequencies coincide with a blind spot).

Figure 10:
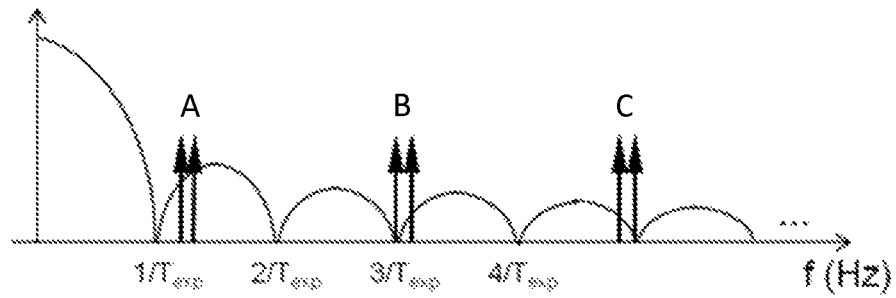
FIG. 10 schematically illustrates low-pass filter characteristics of an image capturing unit together an alternative for a signal spectrum.
Figure 11:
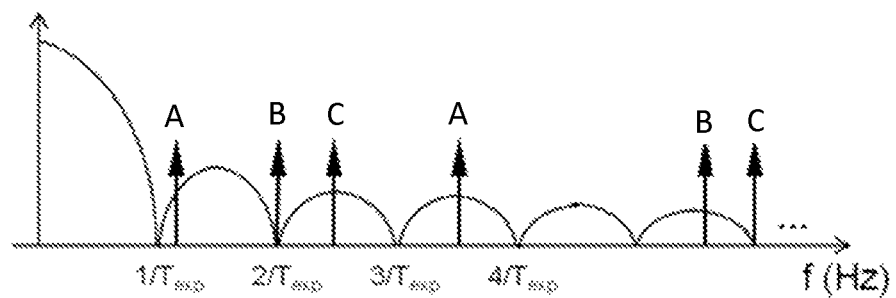
FIG. 11 schematically illustrates low-pass filter characteristics of an image capturing unit together another alternative for a signal spectrum.

In embodiments, a repetitive signal is generated such that it contains two dominant frequencies. E.g. one way to generate such a signal is to sum at least two different signals, each with a different dominant frequency. FIGS. 10 and 11 depict the signal spectrum of a number of possible frequency allocations, produced by a sum of different signals with different frequencies. Each of the commonly labelled frequency components are associated with one single light source, e.g. (referring to the numerals of FIG. 1) the components labelled A being from a first light source 2a, the components labelled B being from a second light source 2b, and the components labelled C being from a third light source 2c. In the examples of FIGS. 10 and 11, of the signal A both components are detectable, of the signal B the lower frequency component is lost, and of the signal C the higher frequency component is lost.

FIG. 10 shows one example using two neighbouring frequencies per lamp. The modulation frequencies are close together, but spaced far apart enough that at least one of the modulation frequencies is always detectable regardless of where at least one other of the other falls in the detection spectrum relative to the one or more blind spots. That is, for two neighbouring frequencies, they are not so close that they ever both fall in a blind spot.

Close to a blind spot a frequency undergoes a suppression equal to the magnitude of the sinc-shaped frequency response associated with that particular exposure time $T_{exp}$, so a threshold may be applied to the y-axis of the sinc-shaped detection spectrum and the frequency range around each blind spot that stays below that threshold may be considered to be a "forbidden" zone for frequencies. Therefore the minimum spacing between modulation frequecies may be arranged to correspond to a certain window around the node of the blind spot, for instance defined by a certain fraction or percentage height of the detection spectrum. E.g. if around a given blind spot (say the one at $1/T_{exp}$) the coded light signal is only detectable where the detection spectrum is above a certain threshold height (e.g. a certain percentage of the maximum in terms of received power), the spacing between the modulation frequencies will be at least the distance from the frequency location of the zero node in the detection spectrum to a frequency location corresponding to this minimum detection threshold. That way even if one of the modulation frequencies falls exactly in the centre (node) of the blind spot, the other modulation frequency will still fall at a frequency location in the detection spectrum corresponding to the minimum detection threshold. The particular detection threshold may depend on the apparatus in question.

Such emboidiments are potentially beneficial to the detection algorithm. However, in practice any nonlinearities in the light generation may cause one or more additional, low frequency signal components that fall within the human perceptible range. Such (unwanted) low frequency components are due to an intermodulation effect, which can occur when the two (intentional) signal componetns are too close togther. Hence in embodiments, the modulation may be generated with widely spaced frequency components to avoid this effect, at least so that any intermodulation frequency falls outside the human perceptible range. An example of more widely spaced modulation frequecies is shown schematically in FIG. 11.

If the two (or more) modulation frequenies are spaced widely apart, they will not fall in the same blind spot, but without planning there still is a chance they will fall in different blind spots. E.g. one could fall at the node at $1/T_{exp}$ and one at the next node at $2/T_{exp}$, or at $3/T_{exp}$, etc. So to reduce the risk of hitting more than one blind spot, in embodiments the two (or more) frequency components are generated so as not to have an harmonic relationship, at least in that one is not an integer multiple of another. In embodiments, one is also not a half integer multiple of another. In further embodiments, one is not n/3 times the other and/or is not n/4 times the other, etc. where n is an integer. In general one frequency may be arranged so that it is not n/m times the other, where the denominator m is an integer and is smaller than a threshold on the denominator (effectively there is a minimum degree to which the relationship is irrational or aharmonic).

As mentioned, one way to generate multiple signal components is to sum the components and use the summed signal to drive a single elementary light source, e.g. single lamp. An altermnitive embodiment to generate multiple signal components from a single luminaire is to use different elementray light sources housed or integrated in the same luminaire, e.g. a plurality of LEDs, and to assign different signals to the different LEDs within the luminaire, again with the same constraints.

Again, it will be appreciated that the above embodiments have been described only by way of example. For instance, the invention is applicable in a wide range of applications, such as detection of coded light with camera based devices such as smartphones and tablet computers, camera-based coded light detection (e.g. for light installation in the consumer and professional domain), personalized light control, light-based object labelling, and light based indoor navigation.

The invention is not limited to use in relation to a remote control or control system for controlling the lighting device or devices. In other emboduiments the coded light techniques disclosed herein may be used to provide information in any circumstances to any suitable capturing unit, e.g. in only one diretcion from the lighting device to the capturing unit rather than as part of a control loop, or to exchange information one some other basis than a master/slave control relationship or the like.

Further, the applicability of the invention is not limited to avoiding blind spots due to rolling shutter techniques, or to blind spots in any particular filtering effect or detection spetcrum. It will be appreciated that the use of different modulation frequencies can reduce the risk of modulation going undetected due to frequency blind spots resulting from any side effect or limitation of any detection device being used to detect the.modulated light In embodiments, the invention is not limited to the use of either time varying modulation frequencies or simultaneous modulation frequencies. In embodiments the lighting device may alternate between two or more different states, at least one (and potentially some or all) of which use two simultaoues modulation components with different frequenies.

Further, it will be appreciated that where the above has been described in terms of modulation frequency, this can equivalently be expressed in terms of modulation period, and vice versa.

Further, in the invention is not limited to symetrical upper and lower limits $+/-\Delta T_t/2$ around the base tone. In other embodiments, the window may be asymmetrical about the nominal base tone, and/or there need not be the same number of modulations frequencies above the base tone as below. Indeed, in embodiments it is not necessary that any one modulation frequency is singled out as being the centre or "base" tone.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A lighting device comprising:
    a light emitter arranged to emit light with a periodic modulation which embeds information into the light; and
    a light driver arranged to drive the light emitter by providing an indicator to the light emitter, the indicator relating to the modulation of the light to be emitted by the light emitter and the light emitter being arranged to emit the light modulated according to said indicator;
    wherein the light driver is arranged to drive the light emitter to emit the light with said information being embedded at a plurality of different modulation periods;
    wherein the light emitter is arranged to emit light to be detected by an image capturing unit; and the light driver is arranged to drive the light emitter to avoid at least one of the modulation periods that corresponds to a frequency blind spot produced by an acquisition process of the image capturing unit.

2. The lighting device of claim 1, wherein the light driver is arranged to change between the different modulation periods over time.

3. The lighting device according to claim 1, wherein said information comprises a unique identifier of said lighting device.

4. The lighting device according to claim 3, wherein said unique identifier is represented by a frequency $f=1/T_{10}$.

5. The lighting device according to claim 1, wherein said modulation is pulse width modulation.

6. The lighting device according to claim 1, wherein said light emitter is further arranged to emit un-modulated light associated with an illumination contribution of said emitted modulated light.

7. The lighting device according to claim 6, wherein said modulation is associated with one and the same state in at least two adjacent pulse width modulation periods.

8. The lighting device of claim 1, wherein the plurality of modulation frequencies are emitted by a same light source of said light emitter.

9. The lighting device of claim 1, wherein the light emitter comprises a plurality of light sources within a same luminaire, and each of the plurality of modulation frequencies is emitted by a respective one of the light sources.

10. A lighting device comprising:
    a light emitter arranged to emit light with a periodic modulation which embeds information into the light; and
    a light driver arranged to drive the light emitter by providing an indicator to the light emitter, the indicator relating to the modulation of the light to be emitted by the light emitter and the light emitter being arranged to emit the light modulated according to said indicator;
    wherein the light driver is arranged to drive the light emitter to emit the light with said information being embedded at a plurality of different modulation periods;
    wherein the light driver is arranged to drive the light emitter in at least two different states wherein the modulation is periodic within each state; and
    wherein in a first state said modulation has a period $T_{11}$, and wherein in a second state said modulation has a period $T_{12} \neq T_{11}$, wherein $T_{11}$ and $T_{12}$ take values within an interval, where $T_{10} > 0$ is a time constant and where $\Delta T_1 > 0$ is a time offset chosen such that visible flicker in the emitted modulated light is avoided.

11. The lighting device according to claim 10, wherein said light driver is arranged to aperiodically alternate said modulation between said first state and said second state.

12. The lighting device according to claim 10, wherein said light driver is arranged to alternate said modulation between said first state and said second state according to a predetermined sequence.

13. The lighting device according to claim 10, wherein said modulation alternates between said first state and said second state according to a random variable.

14. The lighting device according to claim 10, wherein for $T_{12} - T_{10} = T_{10} - T_{11}$ for $T_{12} > T_{11}$.

15. A lighting device comprising:
    a light emitter arranged to emit light with a periodic modulation which embeds information into the light; and
    a light driver arranged to drive the light emitter by providing an indicator to the light emitter, the indicator relating to the modulation of the light to be emitted by the light emitter and the light emitter being arranged to emit the light modulated according to said indicator;
    wherein the light driver is arranged to drive the light emitter to emit the light with said information being embedded at a plurality of different modulation periods;
    wherein the light driver is arranged to drive the light emitter to emit light modulated with a plurality of different modulation periods simultaneously;
    wherein the light emitter is arranged to emit light to be detected by a detecting unit; and
    the modulation frequencies are spaced apart by an amount at least corresponding to an undetectable width of a blind spot in a detection spectrum of the detecting unit, so that at least one of the modulation periods is always detectable regardless of where at least one of the other falls in the detection spectrum relative to the one or more blind spots.

16. A lighting device comprising:
    a light emitter arranged to emit light with a periodic modulation which embeds information into the light; and
    a light driver arranged to drive the light emitter by providing an indicator to the light emitter, the indicator relating to the modulation of the light to be emitted by the light emitter and the light emitter being arranged to emit the light modulated according to said indicator;
    wherein the light driver is arranged to drive the light emitter to emit the light with said information being embedded at a plurality of different modulation periods;
    wherein the light driver is arranged to drive the light emitter to emit light modulated with a plurality of different modulation periods simultaneously;
    wherein the modulation frequencies are spaced apart to avoid an inter-modulation effect between any of the modulation frequencies being within a human perceptible range.

17. A lighting system comprising a number N of lighting devices each comprising:
    a light emitter arranged to emit light with a periodic modulation which embeds information into the light; and
    a light driver arranged to drive the light emitter by providing an indicator to the light emitter, the indicator relating to the modulation of the light to be emitted by the light emitter and the light emitter being arranged to emit the light modulated according to said indicator;

wherein the light driver is arranged to drive the light emitter to emit the light with said information being embedded at a plurality of different modulation periods;

wherein each lighting device is associated with its own unique constant $T_i$, $=1 \ldots N$, wherein the modulation for each lighting device is periodic within each state, wherein in a first state said modulation for light source i has a period $T_{i1}$, and wherein in a second state said modulation for light source i has a period $T_{i2} \neq T_{i1}$, wherein $T_{i1}$ and $T_{i2}$ take values within an interval, where $T_i0 > 0$ is a time constant for light source i and where $\Delta T_i > 0$ is a time offset for light source i chosen such that visible flicker in the emitted modulated light is avoided.

18. The lighting system according to claim 17, where $\Delta T_i \neq \Delta T_j$ for $i \neq j$.

19. The lighting system according to claim 17, where $T_i \neq T_j$ for $i \neq j$.

20. The light system according to claim 17, where: $\Delta T_{i0} \ll T_{20} - T_{10}$, for $T_{20} > T_{10}$ where $T_{10}$ and $T_{20}$ are two time-wise adjacent time constants.

\* \* \* \* \*